United States Patent
Vacca

(10) Patent No.: US 10,746,066 B2
(45) Date of Patent: Aug. 18, 2020

(54) CONTROLLER AND METHOD OF OPERATING AN EXHAUST-GAS PURIFICATION SYSTEM

(71) Applicants: Hyundai Motor Company, Seoul (KR); Kia Motors Corporation, Seoul (KR)

(72) Inventor: Daniele Vacca, Rüsselsheim (DE)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 14 days.

(21) Appl. No.: 16/144,055

(22) Filed: Sep. 27, 2018

(65) Prior Publication Data

US 2020/0011220 A1 Jan. 9, 2020

(30) Foreign Application Priority Data

Jul. 6, 2018 (DE) .................. 10 2018 211 227

(51) Int. Cl.
| | |
|---|---|
| *F01N 3/023* | (2006.01) |
| *F01N 3/08* | (2006.01) |
| *F01N 9/00* | (2006.01) |
| *F01N 3/035* | (2006.01) |
| *F01N 13/00* | (2010.01) |

(52) U.S. Cl.
CPC ............ *F01N 3/023* (2013.01); *F01N 3/035* (2013.01); *F01N 3/0814* (2013.01); *F01N 3/0821* (2013.01); *F01N 3/0842* (2013.01); *F01N 3/0885* (2013.01); *F01N 9/002* (2013.01); *F01N 13/009* (2014.06)

(58) Field of Classification Search
CPC combination set(s) only.
See application file for complete search history.

(56) References Cited

U.S. PATENT DOCUMENTS

| | | | |
|---|---|---|---|
| 7,082,753 B2 | 8/2006 | Dalla Betta et al. | |
| 8,146,346 B2 * | 4/2012 | Ishibashi | F01N 13/009 60/274 |
| 10,287,944 B2 * | 5/2019 | Lee | B01D 53/9418 |
| 2006/0070373 A1 | 4/2006 | Huang et al. | |

(Continued)

FOREIGN PATENT DOCUMENTS

| | | |
|---|---|---|
| EP | 1 857 647 A1 | 11/2007 |
| JP | 2006-226190 A | 8/2006 |

(Continued)

*Primary Examiner* — Binh Q Tran
(74) *Attorney, Agent, or Firm* — Morgan, Lewis & Bockius LLP

(57) ABSTRACT

A controller for an exhaust-gas purification system of a vehicle, may be configured to activate a regeneration of a diesel particulate filter when an amount of exhaust particles inside the diesel particulate filter exceeds a predetermined threshold level, and to activate a regeneration of an NOx trap catalyst at least when an amount of NOx adsorbed to the NOx trap catalyst exceeds a predetermined NOx threshold value, and wherein the controller is further designed to activate the regeneration the NOx trap catalyst at least sometimes at a beginning of and/or during the regeneration of the diesel particulate filter. The present invention further provides a corresponding method of operating an exhaust-gas purification system of a vehicle.

16 Claims, 4 Drawing Sheets

(56) References Cited

U.S. PATENT DOCUMENTS

| | | | |
|---|---|---|---|
| 2006/0137327 A1* | 6/2006 | Shirakawa | F01N 3/0821 60/285 |
| 2007/0130920 A1* | 6/2007 | Nam | B01D 53/9409 60/286 |
| 2009/0158715 A1* | 6/2009 | Stroh | F01N 3/0814 60/295 |
| 2013/0014493 A1* | 1/2013 | Park | F02D 41/0275 60/274 |
| 2017/0044946 A1* | 2/2017 | Merlino | F01N 3/0885 |

FOREIGN PATENT DOCUMENTS

| | | |
|---|---|---|
| KR | 10-0957275 B1 | 5/2010 |
| KR | 10-1326812 B1 | 11/2013 |

* cited by examiner

CONTROLLER AND METHOD OF OPERATING AN EXHAUST-GAS PURIFICATION SYSTEM

CROSS-REFERENCE TO RELATED APPLICATION

The present application claims priority to DE 102018211227.4, filed on Jul. 6, 2018, the entire contents of which is incorporated herein for all purposes by this reference.

BACKGROUND OF THE INVENTION

Field of the Invention

The present invention relates to a controller for an exhaust-gas purification system of a vehicle, an exhaust-gas purification system for a vehicle, a combustion and exhaust-gas purification system for a vehicle and a vehicle. The present invention further relates to a method of operating an exhaust-gas purification system of a vehicle.

Description of Related Art

Generally, a EU6 Diesel engine vehicle is provided with an exhaust-gas purification system including a diesel particulate filter and an NOx trap catalyst. Such an exhaust-gas purification system is disclosed for instance in EP 1 857 647 A1.

During operation of said exhaust-gas purification system, it is necessary due to soot particulate accumulation to perform a regeneration of the diesel particulate filter from time to time to burn exhaust particles gathered inside the diesel particulate filter. It is further necessary to perform a regeneration of the NOx trap catalyst several times to activate a chemical reaction of the nitric oxide (NO) absorbed in the NOx trap catalyst into harmless substances such as carbon dioxide ($CO_2$), water ($H_2O$) and nitrogen ($N_2$) and the like.

FIG. 1 shows a coordinate system to illustrate a conventional regeneration of the diesel particulate filter. The abscissa of the coordinate system of FIG. 1 is an axis of time t [in seconds], while the ordinate represents a temperature $T_0$ [in ° C./degree Celsius] within the diesel particulate filter.

At a time t1 an amount of exhaust particles inside the diesel particulate filter exceeds a provided threshold level. Therefore, a regeneration status mode DePM of the diesel particulate filter is switched from 0 (zero) to 1 (one) and a warm up phase of the conventional regeneration of the diesel particulate filter starts. During the warm up phase the diesel particulate filter is heated to a temperature $T_0$ above a provided temperature threshold $T_{th}$, for instance above a temperature threshold $T_{th}$ of 580° C. At a time t2 the current temperature $T_0$ of the diesel particulate filter is above the temperature threshold $T_{th}$. Therefore, the warm up phase ends at the time t2 and an active phase of the conventional regeneration of the diesel particulate filter starts at the time t2, wherein exhaust particles within the diesel particulate filter are burnt during the active phase of its regeneration. A time interval between the times t1 and t2 may be called a warm up time $\Delta T_0$ of the conventional regeneration of the diesel particulate filter. Typically, the warm up time $\Delta T_0$ of the conventional regeneration of the diesel particulate filter is in a range between 60 s (seconds) and 120 s (seconds).

Consequently, there is a need to improve such a regeneration process of a diesel particulate filter.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a controller configured for an exhaust-gas purification system of a vehicle in accordance with claim 1, an exhaust-gas purification system for a vehicle, a combustion and exhaust-gas purification system for a vehicle, a vehicle and a method of operating an exhaust-gas purification system of a vehicle.

Various exemplary embodiments of the present invention are subject of the further sub-claims and the following description, referring to the drawings.

The idea of the present invention is to use heat generated by the strong exothermal chemical reactions performed during the regeneration of the NOx trap catalyst for the heating of the diesel particulate filter above the temperature threshold. Thus, it is possible to shorten the times required for the regeneration of the diesel particulate filter significantly. Another advantage of the use of the energy released during the regeneration of the NOx trap catalyst is the decrease of energy required, during the diesel particulate filter warm up, to heat the diesel particulate filter above the temperature threshold. The present invention thus provides an opportunity to lower the fuel consumption of a vehicle, due to a shorter time spent in the diesel particulate filter regeneration, especially while the vehicle is in an urban driving mode. Another advantage of the present invention is the decrease of the oil dilution spread during the regeneration of the diesel particulate filter.

According to an advantageous embodiment of the (engine) controller, the controller is designed to trigger an injection device of a combustion engine of a vehicle to heat the diesel particulate filter to a temperature above a provided temperature threshold during a warm up phase of its regeneration so that exhaust particles within the diesel particulate filter are burnt during an active phase of its regeneration, and to activate the regeneration of the NOx trap catalyst either at a beginning of and/or during the warm up phase of the regeneration of the diesel particulate filter or at the beginning of and/or during the warm up phase of the regeneration of the diesel particulate filter in a case that the amount of NOx adsorbed to the NOx trap catalyst exceeds the smaller NOx threshold value. Energy released during the regeneration of the NOx trap catalyst is therefore used to accelerate the temperature increase within the diesel particulate filter. Thus, it possible to decrease the warm up time of the diesel particulate filter significantly and to start the active phase of the regeneration of the diesel particulate filter earlier. T. This provides a more efficient regeneration of the diesel particulate filter, a lower fuel consumption and a lower oil dilution.

According to another exemplary embodiment of the (engine) controller, the controller is designed to activate the regeneration of the NOx trap catalyst by triggering the injection device of the combustion engine of the vehicle so that an oxygen concentration in exhaust-gas flowing into the NOx trap catalyst is decreased. The thus activated rich combustion and the thermal energy developed by the NOx trap catalyst is then used to reduce the duration of the regeneration of the diesel particulate filter, the energy needed to heat the diesel particulate filter and the oil dilution during the regeneration of the diesel particulate filter.

In another advantageous embodiment of the controller, the controller is designed to select the smaller NOx threshold value within a range of values based on position information about a current position of the vehicle provided by a global positioning system of the vehicle. The controller is designed to select a lower NOx threshold value while the current position of the vehicle is within a city, a center of a locality or another densely populated area. Thus, it is possible to avoid oil dilution while driving through densely populated areas.

The above-mentioned advantages are also provided by an exhaust-gas purification system for a vehicle or by a combustion and exhaust-gas purification system for a vehicle with such a controller.

Furthermore, the above-referenced advantages are also provided by a vehicle with such a controller, a corresponding exhaust-gas purification system and/or a corresponding combustion and exhaust-gas purification system.

Finally, the performance of a corresponding method of operating an exhaust-gas purification system of a vehicle also provides the advantages of the above-mentioned embodiments of the controller. All features of the controller described above are also disclosed for the method of operating an exhaust-gas purification system and vice versa.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
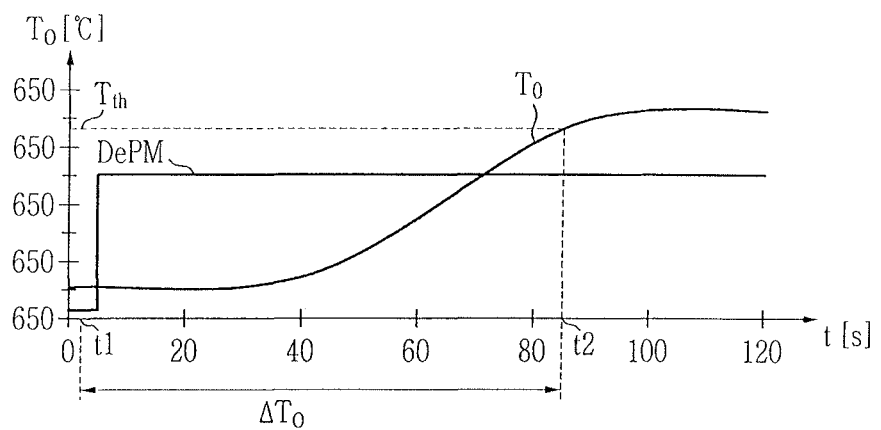
FIG. 1 shows a coordinate system to illustrate a conventional regeneration of the diesel particulate filter.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Figure 2A:
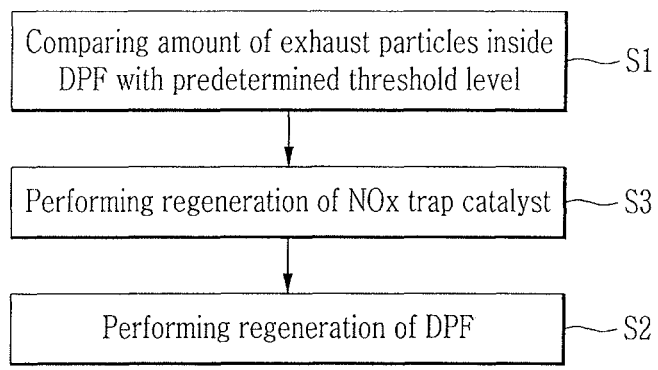
FIG. 2A and FIG. 2B show a flow diagram and a coordinate system to illustrate various exemplary embodiments of the method of operating an exhaust-gas purification system of a vehicle.
Figure 2B:
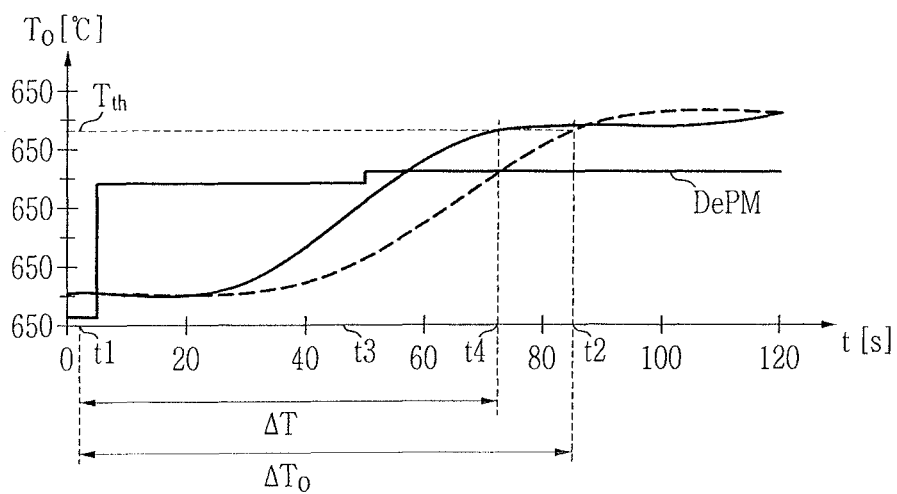

FIG. 2A and FIG. 2B show a flow diagram and a coordinate system to illustrate various exemplary embodiments of the method of operating an exhaust-gas purification system of a vehicle. The abscissa of the coordinate system of FIG. 2B is an axis of time t [in seconds], while the ordinate of the coordinate system of FIG. 2B represents a temperature T [in ° C./degree Celsius] within a diesel particulate filter of the exhaust-gas purification system.

The method described in more details below is performable with every exhaust-gas purification system of a vehicle including a diesel particulate filter and an NOx trap catalyst. A feasibility of the method is not restricted to a certain type of the vehicle or its exhaust-gas purification system.

Typically, the diesel particulate filter is used in its normal functioning mode on a downstream side of a combustion engine/motor of said vehicle to filter exhaust particles such as soot particles and ash particles out of an exhaust-gas of the combustion engine. After a certain time spent in its normal functioning mode the diesel particulate filter is filled up with exhaust particles. Depending on a current driving style of a driver of the vehicle (urban driving style, extra urban driving style or highway driving style) the amount of exhaust particles inside the diesel particulate filter may increase faster or slower. It is therefore necessary to perform a regeneration of the diesel particulate filter from time to time.

The NOx trap catalyst is a lean NOx trap catalyst. The NOx trap catalyst may also be called a lean NOx trap (LNT). Such an NOx trap catalyst is typically used in its normal functioning mode on the downstream side of the combustion engine of the vehicle to filter nitric oxide (NO/NOx) out of the exhaust-gas of the combustion engine by its chemical reaction with a wash coat of the NOx trap catalyst. Like the diesel particulate filter, the NOx trap catalyst also requires a regeneration now and then for converting the nitric oxide (NO/NOx) absorbed to the NOx trap catalyst in harmless substances such as carbon dioxide ($CO_2$), water ($H_2O$) and nitrogen ($N_2$) and the like.

The method of operating an exhaust-gas purification system of the vehicle includes a method step S1 of comparing an amount of exhaust particles inside the diesel particulate filter with a predetermined threshold level. The amount of exhaust particles inside the diesel particulate filter may be detected by at least one sensor of the diesel particulate filter. The amount of exhaust particles inside the diesel particulate filter may also be estimated. The estimation of the amount of exhaust particles inside the diesel particulate filter during its normal functioning mode may be performed by any conventional logic/model. The method step S1 may be repeated with a predetermined repetition rate while the diesel particulate filter is in its normal functioning mode. (While the diesel particulate filter is in its normal functioning mode, the NOx trap catalyst may also be operating in its normal functioning mode.)

Preferably, no regeneration of the diesel particulate filter of the exhaust-gas purification system is performed while the amount of exhaust particles inside the diesel particulate filter is still below the threshold level. When it is ascertained in method step S1 that the amount of exhaust particles inside the diesel particulate filter exceeds the threshold level, a regeneration of the diesel particulate filter of the exhaust-gas purification system is performed by a method step S2. In the example of FIGS. 2A and 2B, the estimated or detected amount of exhaust particles inside the diesel particulate filter exceeds the threshold level at a time t1. Thus, the normal functioning mode of the diesel particulate filter stops at the time t1 and a regeneration status mode DePM of the diesel particulate filter is switched from 0 (zero) to a value between 0 and 1 (one) at the time t1, so that the method step S2 is started at the time t1. To start the method step S2, the diesel particulate filter is heated to a temperature T above a predetermined temperature threshold $T_{th}$ (for instance above a temperature threshold $T_{th}$ of 580° C.) thus causing a warm up phase of the regeneration of the diesel particulate filter. The heating of the diesel particulate filter is started at the time t1.

Together with the method step S2, which is performed when the amount of exhaust particles inside the diesel particulate filter exceeds the threshold level, a method step S3 is also performed. Thus, the sub-step S4b is performed before or during the warm up phase of the regeneration of the diesel particulate filter. As the method step S3 a regeneration of the NOx trap catalyst is performed at a beginning of and/or during the regeneration of the diesel particulate filter. The regeneration of the NOx trap catalyst (method step S3) is performed at a beginning of and/or during the warm up phase of the regeneration of the diesel particulate filter. For instance, the method step S3 may be started when it is ascertained that the amount of exhaust particles inside the diesel particulate filter exceeds the threshold level.

The regeneration of the NOx trap catalyst may be activated by triggering an injection device of the combustion engine so that an oxygen concentration of an exhaust-gas flowing into the NOx trap catalyst is decreased. However, the feasibility of the method of operating an exhaust-gas purification system of a vehicle is not restricted to a certain technique of activating the regeneration of the NOx trap catalyst.

The regeneration of the NOx trap catalyst causes strong exothermal chemical reactions which heat the exhaust-gas blown into the diesel particulate filter and thus accelerate the heating of the diesel particulate filter to a temperature T above the temperature threshold $T_{th}$. Thus, it is possible to decrease a duration of the regeneration of the diesel particulate filter by performing the method step S3. Moreover, it is possible to decrease an oil dilution during the regeneration of the diesel particulate filter by performing the method step S3.

In the example of FIGS. 2A and 2B, the method step S3 regeneration of the NOx trap catalyst ends at a time t3. The regeneration status mode DePM of the diesel particulate filter is therefore switched to 1 (one) at the time t3.

When the current temperature T of the diesel particulate filter exceeds the temperature threshold $T_{th}$, the temperature T of the diesel particulate filter is controlled and maintained above the temperature threshold $T_{th}$ (for instance around a temperature of 620° C.). Thus, exhaust particles within the diesel particulate filter are burnt during an active phase of the regeneration of the diesel particulate filter. Typically, the exhaust particles inside the diesel particulate filter start to burn when the temperature T of the diesel particulate filter exceeds 600° C. Thus, an "unloading regeneration" of the diesel particulate filter is achieved during the active phase of the regeneration of the diesel particulate filter.

It may be ascertained that the temperature T of the diesel particulate filter exceeds the temperature threshold $T_{th}$ by use of at least one temperature sensor of the diesel particulate filter. However, the feasibility of the method described here is not restricted to the use of such a temperature sensor of the diesel particulate filter. In the example of FIGS. 2A and 2B, the temperature T of the diesel particulate filter exceeds the temperature threshold $T_{th}$ at a time t4. A. A time interval between the times t1 and t4 may be called a warm up time $\Delta T$ of the regeneration of the diesel particulate filter. Typically, the warm up time $\Delta T$ is in a range between 40 s (seconds) and 80 s (seconds). Thus, the warm up time $\Delta T$ of the present exemplary embodiment of the present invention is significantly shorter than the warm up time $\Delta T_0$ of the conventional regeneration of the diesel particulate filter of FIG. 1. A time difference between the warm up times $\Delta T$ and $\Delta T_0$ may be in a range between 20 s (seconds) to 40 s (seconds). The graph $T_0$ of FIG. 1 is also shown in the coordinate system of FIG. 2B.

The method of operating an exhaust-gas purification system of a vehicle thus combines two different strategies of regenerating the diesel particulate filter and regenerating the NOx trap catalyst to optimize the regeneration of a diesel particulate filter by decreasing the duration the regeneration of a diesel particulate filter. The regeneration of the NOx trap catalyst performed as method step S3 causes strong exothermal chemical reactions which heat the exhaust-gas blown into the diesel particulate filter. Therefore, by regenerating the NOx trap catalyst at the beginning of and/or during the regeneration of the diesel particulate filter it is possible to decrease the duration of the regeneration of the diesel particulate filter and to decrease the energy necessary for heating the diesel particulate filter to a temperature T above the threshold temperature $T_{th}$. The decrease of the duration of the regeneration of the diesel particulate filter causes a decrease in oil dilution during the regeneration of the diesel particulate filter and a decrease of thermal stress performed on the components of the diesel particulate filter. Furthermore, the decrease of the energy needed to heat the diesel particulate filter causes a decrease of fuel consumption.

Figure 3:
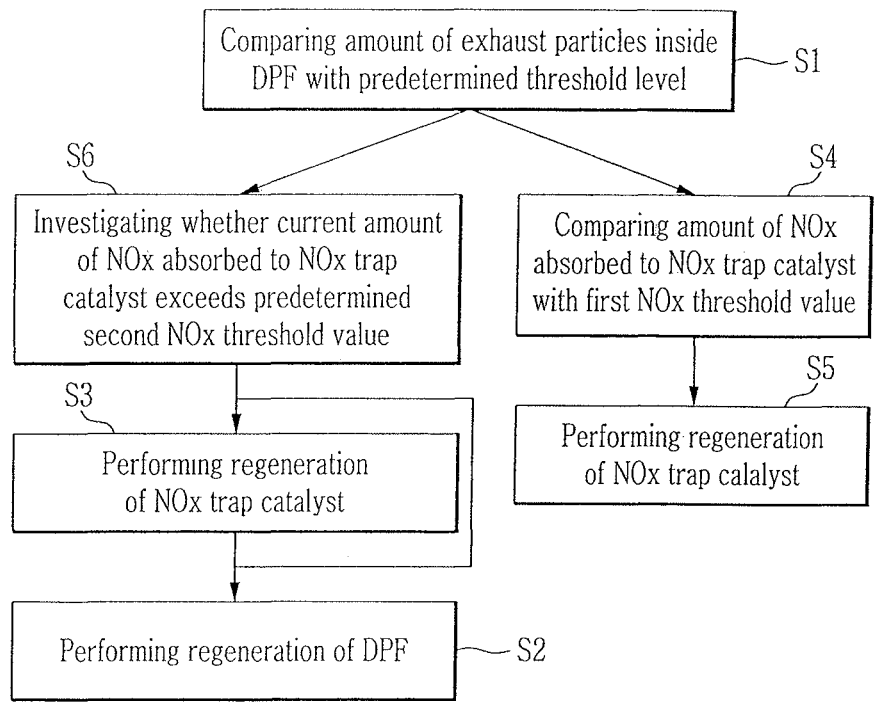
FIG. 3 shows a flow diagram to illustrate various exemplary embodiments of the method of operating an exhaust-gas purification system of a vehicle.

FIG. 3 shows a flow diagram to illustrate various exemplary embodiments of the method of operating an exhaust-gas purification system of a vehicle.

The method of operating an exhaust-gas purification system of a vehicle described here also includes the method steps S1 to S3.

However, the method of FIG. 3 also includes an optional method step S4 which is performed when the amount of exhaust particles inside the diesel particulate filter is still below the threshold level. As the optional method step S4, an amount of NOx absorbed to the NOx trap catalyst may be compared with a provided first NOx threshold value. The amount of NOx absorbed to the NOx trap catalyst may be measured by at least one sensor of the NOx trap catalyst or may be estimated by any conventional logic/model. The first NOx threshold value may correspond to an amount of NOx absorbed to the NOx trap catalyst that makes a regeneration of the NOx trap catalyst necessary. The optional method step S4 may be repeated with a provided repetition rate while the NOx trap catalyst is in its normal functioning mode.

When the amount of NOx absorbed to the NOx trap catalyst exceeds the first NOx threshold value, the regeneration of the NOx trap catalyst of the exhaust-gas purification system may be performed as an optional method step S5. Preferably, no regeneration of the NOx trap catalyst of the exhaust-gas purification system is performed while the amount of exhaust particles inside the diesel particulate filter is still below the threshold level and the amount of NOx absorbed to the NOx trap catalyst is still below the first NOx threshold value.

Moreover, the method of FIG. 3 also includes an optional method step S6, which is performed when it is ascertained in method step S1 that the amount of exhaust particles inside the diesel particulate filter exceeds the threshold level. The method step S6 may be performed before or at the beginning of method step S2. As method step S6 it is investigated whether the current amount of NOx absorbed to the NOx trap catalyst exceeds a predetermined second NOx threshold value smaller than the first NOx threshold value.

The second NOx threshold value may be chosen so low that a regeneration of the NOx trap catalyst is only performable when the amount of NOx absorbed to the NOx trap catalyst exceeds the second NOx threshold value. However, the second NOx threshold value may also be a self-determined value. For instance, it is possible to detect a current position of the vehicle by a global positioning system of the vehicle and then to select the second NOx threshold value within a range of values based on the current position provided by the global positioning system. The controller is designed to select a lower second NOx threshold value of NOx when the current position of the vehicle is within a city, a center of a locality or another densely populated area. It is advantageous when the second NOx threshold value is especially low when the vehicle is driving through a city, a center of a locality or another densely populated area to ensure that the people living in said area are not incommoded by the oil dilution.

In a case that the amount of NOx absorbed to the NOx trap catalyst exceeds the second NOx threshold value of NOx, the method step S3 is performed to provide the advantages explained above. Otherwise, the method step S3 is not performed when it is ascertained that the amount of NOx absorbed to the NOx trap catalyst is still below the second NOx threshold.

Figure 4:
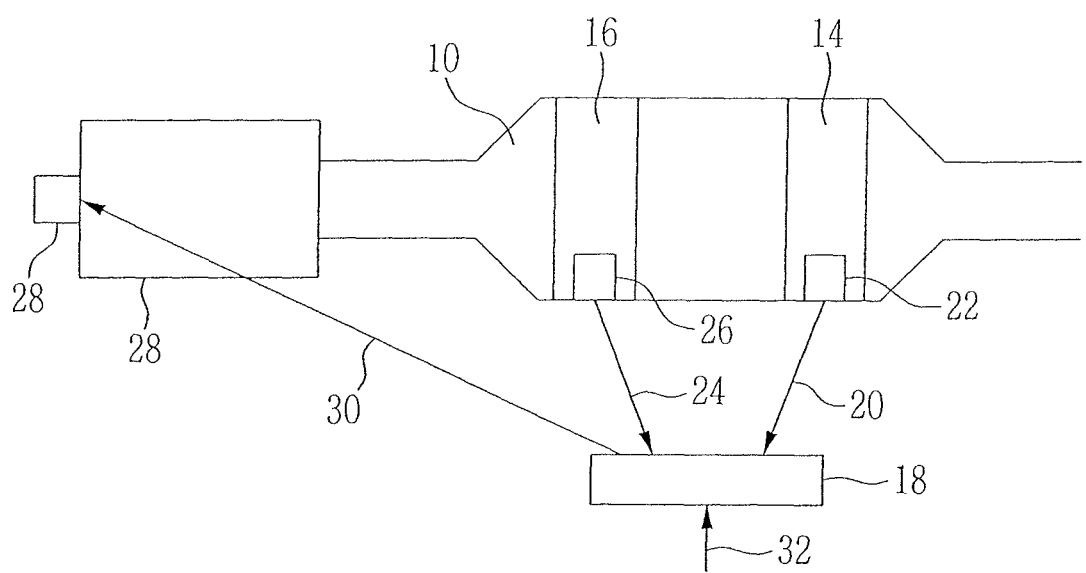
FIG. 4 shows a schematic view of an exemplary embodiment of the controller and an exhaust-gas purification system disposed with said controller.

FIG. 4 shows a schematic view of an exemplary embodiment of the controller and an exhaust-gas purification system disposed with said controller.

The exhaust-gas purification system shown in FIG. 4 is disposed in an exhaust passage 10 of a combustion engine/motor 12 of a vehicle. An applicability of the exhaust-gas purification system is not restricted to a certain type of the vehicle or its combustion engine 12.

The exhaust-gas purification system includes a diesel particulate filter 14 and an NOx trap catalyst 16 internally disposed within the exhaust passage 10. The NOx trap catalyst 16 is disposed in the exhaust passage 10 between the diesel particulate filter 14 and the combustion engine 12. The normal functional modes of the diesel particulate filter 14 and the NOx trap catalyst 16 are already described above.

The exhaust-gas purification system further includes the engine controller 18 designed to operate the diesel particulate filter 14 and the NOx trap catalyst 16. The controller 18 is especially designed to activate a regeneration of the diesel particulate filter 14 when an amount of exhaust particles inside the diesel particulate filter 14 exceeds a predetermined threshold level. For instance, the controller 18 may receive at least a first sensor signal 20 of at least a first sensor 22 that indicates that the amount of exhaust particles inside the diesel particulate filter 14 exceeds the threshold level. However, the controller 18 may also be designed to estimate the amount of exhaust particles inside the diesel particulate filter 14 based on any conventional logic/model.

The controller 18 is also designed to activate a regeneration of the NOx trap catalyst 16 of the exhaust-gas purification system at least when an amount of NOx adsorbed to the NOx trap catalyst 16 exceeds a predetermined NOx threshold value. For instance, the controller 18 may receive at least a second sensor signal 24 of at least a second sensor 26 that indicates that the amount of NOx adsorbed to the NOx trap catalyst 16 exceeds the NOx threshold value. The controller 18 may also be designed to estimate the amount of NOx adsorbed to the NOx trap catalyst 16 by any conventional logic/model.

The controller 18 is further designed to activate the regeneration the NOx trap catalyst 16 at a beginning of and/or during the regeneration of the diesel particulate filter 14. The regeneration the NOx trap catalyst 16 may be performed always at the beginning of and/or during the regeneration of the diesel particulate filter 14 or only in a case that the amount of NOx adsorbed to the NOx trap catalyst 16 exceeds a predetermined smaller NOx threshold value. The controller 18 is thus designed to provide a fast heating of the diesel particulate filter 14 in all driving styles of a driver of the vehicle (e.g., urban driving style, extra urban driving style or highway driving style). Even during a driving style of the vehicle with frequent starts and stops the regeneration of the diesel particulate filter 14 can be performed in a significant short time. Due to the decrease of the duration of regeneration of the diesel particulate filter 14 an oil dilution occurring during the regeneration of the diesel particulate filter 14 is reduced. The controller 18 further ensures that less energy is required to heat the diesel particulate filter 14 for its regeneration. The advantageous operation of the controller 18 further provides a better management of a temperature within the diesel particulate filter 14.

For instance, the controller 18 may be designed to trigger an injection device 28 of the combustion engine 12 by at least one command signal 30 to heat the diesel particulate filter 14 to a temperature above the temperature threshold during a warm up phase of its regeneration so that exhaust particles within the diesel particulate filter 14 are burnt during an active phase of its regeneration (after the warm up phase). In the instant case it is advantageous when the controller 18 is designed to activate the regeneration of the NOx trap catalyst 16 at a beginning of and/or during the warm up phase of the regeneration of the diesel particulate filter 14 (at least in a case that the amount of NOx adsorbed to the NOx trap catalyst 16 exceeds the smaller NOx threshold value).

The controller 18 may be designed to activate the regeneration of the NOx trap catalyst 16 by triggering the injection device 28 of the combustion engine 12 by the at least one command signal 30 so that an oxygen concentration in exhaust-gas flowing into the NOx trap catalyst 16 is decreased. The controller 18 may further be designed to select the smaller NOx threshold value within a range of values based on a position information 32 about a current position of the vehicle predetermined by a global positioning system of the vehicle. The advantage of such an exemplary embodiment of the controller 18 is already explained above.

The advantages of the controller 18 are also predetermined by the exhaust-gas purification system for a vehicle with the controller 18, the cooperating diesel particulate filter 14, and the cooperating NOx trap catalyst 16. Moreover, the advantages of the controller 18 are also predetermined by a combustion and exhaust-gas purification system for a vehicle with the controller 18, the cooperating injection device 28 with the combustion engine 12, the cooperating diesel particulate filter 14, and the cooperating NOx trap catalyst 16. The advantages are also predetermined by a vehicle with such a controller 18 or such an exhaust-gas purification system.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A controller for an exhaust-gas purification system of a vehicle, wherein the controller is configured:
   to activate a regeneration of a diesel particulate filter of the exhaust-gas purification system when an amount of exhaust particles inside the diesel particulate filter exceeds a predetermined threshold level; and
   to activate a regeneration of an NOx trap catalyst of the exhaust-gas purification system when an amount of NOx adsorbed to the NOx trap catalyst exceeds a predetermined first NOx threshold value,
   wherein the controller is further configured to activate the regeneration of the NOx trap catalyst at a beginning of or during the regeneration of the diesel particulate filter when the amount of NOx adsorbed to the NOx trap catalyst exceed a predetermined second NOx threshold value smaller than the first predetermined NOx threshold value.

2. The controller according to claim 1, wherein the controller is further configured to activate the regeneration of the NOx trap catalyst at a beginning of or during the regeneration of the diesel particulate filter.

3. The controller according to claim 1, wherein the controller is configured to trigger an injection device of a combustion engine of the vehicle to heat the diesel particulate filter to a temperature above a predetermined temperature threshold during a warm up phase of regeneration thereof so that the exhaust particles within the diesel particulate filter are burnt during an active phase of the regeneration thereof.

4. The controller according to claim 3, wherein the controller is configured to activate the regeneration of the NOx trap catalyst at a beginning of or during the warm up phase of the regeneration of the diesel particulate filter.

5. The controller according to claim 3, wherein the controller is configured to activate the regeneration of the NOx trap catalyst at the beginning of or during the warm up phase of the regeneration of the diesel particulate filter when the amount of NOx adsorbed to the NOx trap catalyst exceeds the second predetermined NOx threshold value.

6. The controller according to claim 3, wherein the controller is configured to activate the regeneration of the NOx trap catalyst by triggering the injection device of the combustion engine of the vehicle so that an oxygen concentration in exhaust-gas flowing into the NOx trap catalyst is decreased.

7. The controller according to claim 1, wherein the controller is configured to select the second predetermined NOx threshold value within a range of values based on position information about a current position of the vehicle provided by a global positioning system of the vehicle.

8. The exhaust-gas purification system for the vehicle, the exhaust-gas purification system comprising:
   the controller according to claim 1;
   the diesel particulate filter of the claim 1, wherein the diesel particulate filter is mounted to an exhaust passage connected to a combustion engine; and
   the NOx trap catalyst of the claim 1, wherein the NOx trap catalyst is mounted to the exhaust passage.

9. A combustion and exhaust-gas purification system for the vehicle comprising:
   the controller of the claim 3;
   the injection device and the combustion engine of the claim 3, wherein the injection device is coupled to the combustion engine;
   the diesel particulate filter of the claim 3, wherein the diesel particulate filter is mounted to an exhaust passage connected to the combustion engine; and
   the NOx trap catalyst of the claim 3, wherein the NOx trap catalyst is mounted to the exhaust passage.

10. The vehicle with the controller according to claim 1.

11. The vehicle with the exhaust-gas purification system of claim 8.

12. The vehicle with the combustion and exhaust-gas purification system of claim 9.

13. A method of operating an exhaust-gas purification system of a vehicle, the method comprising:
   activating of regenerating, by a controller, a diesel particulate filter of the exhaust-gas purification system when an amount of exhaust particles inside the diesel particulate filter exceeds a predetermined threshold level,
   activating of regenerating, by the controller, an NOx trap catalyst of the exhaust-gas purification system when an amount of NOx adsorbed to the NOx trap catalyst exceeds a predetermined first NOx threshold value,
   wherein the activating of regeneration of the NOx trap catalyst is performed at a beginning of or during the regeneration of the diesel particulate filter, filter when the amount of NOx adsorbed to the NOx trap catalyst exceeds a predetermined second NOx threshold value smaller than the predetermined first NOx threshold value.

14. The method according to claim 13, further including:
   investigating, by the controller, when the amount of the exhaust particles inside the diesel particulate filter exceeds the predetermined threshold level, whether the amount of NOx adsorbed to the NOx trap catalyst exceeds the predetermined second NOx threshold value; and, when the amount of NOx adsorbed to the NOx trap catalyst exceeds the predetermined second NOx threshold value, regenerating the NOx trap catalyst at the beginning of or during the regeneration of the diesel particulate filter.

15. The method according to claim 13,
   wherein the diesel particulate filter is heated to a temperature above a predetermined temperature threshold during a warm up phase of regeneration thereof so that the exhaust particles in the diesel particulate filter are burnt during an active phase of regeneration thereof, and wherein the regeneration of the NOx trap catalyst is performed at a beginning of or during the warm up phase of the regeneration of the diesel particulate filter when the amount of NOx adsorbed to the NOx trap catalyst exceeds the predetermined second NOx threshold value.

16. The method according to the claim 13, wherein a current position of the vehicle is detected by a global positioning system of the vehicle and the predetermined second NOx threshold value is selected within a range of values based on the current position by the global positioning system.

* * * * *